3,351,489
STABLE AMYLOSE DISPERSIONS AND METHOD OF PREPARING THEM
Orlando A. Battista, Yardley, Pa., assignor to FMC Corporation, Philadelphia, Pa., a corporation of Delaware
No Drawing. Filed Sept. 8, 1964, Ser. No. 395,050
6 Claims. (Cl. 127—32)

ABSTRACT OF THE DISCLOSURE

An amylose rich starch material which is capable of forming stable dispersions is prepared by an acid hydrolyzing treatment which permits the formation of gel forming particles by mechanical disintegration of the amylose.

---

Amylose or starches rich in amylose are not capable of forming stable gels or dispersions in water even after considerable mechanical disintegration. Stable amylose gels would be useful as bases for cosmetic and pharmaceutical preparations, foods and in numerous other applications such as the manufacture of water-dispersible packaging films.

It is an object of this invention to provide an amylose material capable of forming a stable dispersion in water and other liquid medium.

It is another object of this invention to provide stable aqueous gels of amylose material.

It is still another object of this invention to provide a method for the manufacture of amylose material capable of forming a stable suspension in water.

These and other objects are accomplished by the acid hydrolysis of amylose material to partially degrade it and thereafter mechanically attriting to form a finely-divided product capable of forming a stable suspension.

Amylose material, for the purposes of this invention in a starch containing at least a major proportion and preferably at least 85% amylose.

Acid hydrolysis of the amylose material may be obtained with various inorganic and organic acids or acidic mediums to produce a water-insoluble, attritable material. In the preferred form, however, it is hydrolyzed by treating it with an aqueous solution of hydrochloric acid at a concentration of at least 0.01 N up to 2.5 N for from 1 to 30 minutes under reflux conditions. Acid concentrations over 0.25 N result in much poorer yields while concentrations under 0.1 require excessive time for sufficient hydrolysis. The acid hydrolyzed product is generally thoroughly washed to remove acid prior to attrition.

The mechanical disintegration of the amylose material may be carried out in several ways, as by subjecting it to attrition in a mill, or to a high speed cutting action, or to the action of high pressures. Disintegration is generally carried out in the presence of a liquid medium, preferably water, although where high pressure attrition alone is employed, such medium, while desirable, it not necessary. Although water is the preferred liquid medium, other liquids are suitable. Sugar solutions, polyols, of which glycerol is an example, alcohols, particularly ethanol, isopropanol, and the like are good examples of suitable liquid mediums. Whatever method is used, the disintegration is carried out to such an extent that the resulting finely-divided product is characterized by its ability to form a stable suspension in the liquid medium in which it is attrited or in which it is subsequently dispersed. By a stable suspension or dispersion is meant one from which the attrited material will contain sufficient submicron particles to prevent settling and promote indefinite suspension, even for periods measured in terms of weeks or months. In general, dispersions of the attrited amylose persist up to at least about 5% solids while the gel phase begins at about 10% solids in an aqueous medium. The above applies under ample but not maximum attrition conditions while more severe or effective mechanical treatment will free more submicron microcrystalline particles thus permitting the formation of gels at lower solids concentrations.

For the purpose of this invention the term "dispersion" broadly covers the term "gel."

Following the mechanical disintegration of the hydrolyzed material, the resulting product, whether a dispersion or gel may be used as such; or it may be dewatered and dried; or it may be desirable to separate it into fractions having a more uniform particle size distribution. The dried attrited material is readily redispersed in water with the help of a blender-type agitator.

For producing the dried products a number of procedures are available, and while redispersible materials result from each procedure, some procedures are more advantageous than others. Examples of drying procedures include freeze drying, spray drying, drum drying, liquid-displacement drying, and oven drying.

Fractionation of the hydrolyzed, attrited amylose may be accomplished by means of such separation procedures as mechanical sifting, settling in liquid medium, or centrifuging. Cyclone-type separators are very useful for the dried product.

The following examples are set forth to demonstrate this invention.

Example I 600 ml. of 0.1 N hydrochloric acid were heated to boiling in each of four closed reaction flasks. 50 gms. of dry starch (85% amylose) were added to the boiling hydrochloric acid in each of the reaction flasks. Acid hydrolysis in each flask was continued respectively for 1, 5, 10 and 15 minute periods.

After each hydrolysis the product was quenched in an ice bath, washed free of acid, and vacuum dried at 50° C. After a yield of the material was calculated a slurry of 5% solids in water was attrited in a Waring Blendor for 15 minutes. The dispersions in which hydrolysis was continued for 1, 5 and 10 minutes, respectively, each settled out of solution in varying degrees after attrition in the Waring Blendor for 15 minutes. The dispersion of the product of 15 minutes of hydrolysis was a white, stable dispersion after attrition.

The yield of degraded amylose which received the 15 minutes hydrolysis and which subsequently produced the stable dispersion was 76%.

Example II 200 grams of a starch containing 85% amylose was added to 2000 ml. of a 0.25 N aqueous solution of hydrochloric acid. This mixture was then brought to boil and refluxed for 15 minutes with stirring.

The hydrolyzed product was purified by repeated washings with water and then diluted with water to 5% solids concentration. This diluted mixture was subjected to attrition for 15 minutes in Waring Blendor to produce a smooth, white, stable gel. Microscopic study of this material showed the particles to be crystallites of a plate-like configuration.

In theory, the controlled hydrolysis treatment of the amylose breaks down or loosens amorphous areas present therein and leaves only the more crystalline material which is more readily attritable to colloid-forming particles capable of forming stable gels and dispersions.

Various changes and modifications may be made practicing the spirit and scope thereof and, therefore, the invention is not to be limited except as defined in the appended claims.

I claim:

1. A composition of matter comprising an acid hydrolyzed, finely-divided starch material containing at least a major proportion of amylose, at least a portion of said amylose having submicron particle size, said portion being in an amount sufficient to form a stable dispersion.

2. A stable dispersion comprising acid hydrolyzed, mechanically attrited starch material containing at least a major proportion of amylose, at least a portion of said amylose having submicron particle size, said portion being in an amount sufficient to form a stable dispersion, and an aqueous medium.

3. The stable dispersion of claim 2 containing at least about 5% by weight of said starch material.

4. A method of preparing a starch material containing at least a major proportion of amylose capable of forming a stable dispersion which comprises hydrolyzing the amylose in said starch material with an acid hydrolyzing medium to obtain a water-insoluble attritable material, and then mechanically attriting said material to obtain submicron particles of amylose in an amount capable of forming a stable dispersion when mixed in an aqueous medium.

5. A method of preparing a starch material, containing at least a major proportion of amylose, in a stable dispersion which comprises hydrolyzing the amylose in said starch material with a mineral acid to obtain water-insoluble attritable material, washing the hydrolyzed material with water, and then mechanically attriting said material by agitating a mixture of said material in an aqueous medium to obtain submicron particles of amylose in an amount sufficient to form a stable dispersion.

6. The method of claim 5 wherein the mineral acid is hydrochloric acid in a concentration of at least 0.1 up to 0.25 N and the hydrolysis is carried out under reflux conditions for from 1 to 30 minutes.

References Cited

UNITED STATES PATENTS 3,073,724   1/1963   Rankin et al. _____ 127—70 X
3,224,903   12/1965   Commerford et al. __ 127—32 X

OTHER REFERENCES

Senti, F. R., et al.: High-Amylose Cornstarch-Properties and Prospects, TAPPI, April 1960, vol. 43, No. 4, pp. 343–349.

MORRIS O. WOLK, Primary Examiner.

M. E. ROGERS, Examiner.

E. G. WHITBY, Assistant Examiner.